Feb. 8, 1927.　　　T. NAKAYAMA　　　1,617,025

ROCK DRILL

Filed March 8, 1926

Inventor
T. Nakayama
by Langner, Parry, Card & Langner
Att'ys.

Patented Feb. 8, 1927.

1,617,025

UNITED STATES PATENT OFFICE.

TAKASUKE NAKAYAMA, OF OSAKA, JAPAN, ASSIGNOR TO SEIMEI HARA AND GOSHI-KAISHA NAKAYAMA KOGYO-SHO, OF OSAKA, JAPAN.

ROCK DRILL.

Application filed March 8, 1926, Serial No. 93,244, and in Japan April 20, 1925.

This invention relates to improvements in rock drills driven by electric motors. It consists of a shaft which is a sliding fit in the rotor; one end of the shaft being provided with a toothed wheel geared to another toothed wheel, which in turn, drives the drill, while the other end of the shaft is connected by a ball joint with a spherical pivot located eccentrically on a table which can be turned at will.

The object of this invention is, 1 to strike the drill once per revolution of the rotor while the latter rotates the former, 2 to facilitate the control of the striking force of the drill, and finally to obtain a compact rock drill with a high efficiency:

The accompanying drawings show the construction of the rock drill according to this invention, in which—

Figure 1:
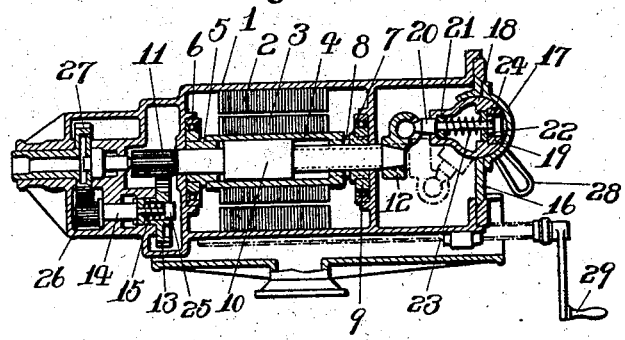
Fig. 1 is a sectional elevation on the centre line of the rock drill.
Figure 2:
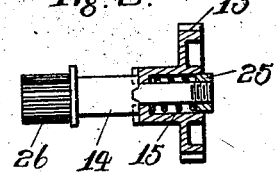
Fig. 2 is a plan of the spindle with the toothed wheel which drives the drill, showing a trapezoidal recess of the claw clutch.

In Fig. 1, 1 is the cylindrical frame of the rock drill, which can be moved backwards or forwards by the screw with handle 29, and 2 is the stator of the electric motor provided inside the frame, while 3 is the rotor; its sheet-iron core being mounted on sleeve 4. A short pipe 5 is extended from, and forms part of the sleeve, and is mounted so that it can rotate in ball bearing 6. A flanged pipe 7 that can rotate freely in ball bearing 9 provided with keys 8 which extend into the adjacent end of the sleeve and fit into keyways on shaft 10. This shaft extends through the sleeve 4 and the pipe 5, and rotates with the rotor by means of the keys 8, but can slide axially along the sleeve. An elongated toothed wheel 11 is provided at one end of the shaft while ball joint 12 is provided at the other end. The wheel 11 gears with another toothed wheel 13 which is loosely fitted on stepped spindle 14, on which is wheel 26 driving wheel 27 which carries a chuck for the drill. The boss of the wheel 13 has two or three trapezoidal projections which fit into the corresponding recesses on the shoulder of the stepped spindle and forms a claw clutch. Each side of the projection and the recess is properly inclined to the axial line as shown in Fig. 2. In a central recess in the boss of the wheel is provided with a spring 15, and a nut 25 screwed on the end of the spindle 14 makes the spring press the boss into the clutch member of the spindle, and should the drill not rotate due to any abnormal resistance or accident, the boss is automatically forced outwards due to the inclination of the recess and projection of the claw clutch compressing the spring, and disengaging the clutch so that the wheel rotates freely on the spindle.

At the rear end of the frame is a table 16 eccentrically fitted which can be rotated at will by means of a handle 28. A spherical pivot comprising a semi-spherical recess 17 and a spherical member 18 is eccentrically provided on the table, and a rod 20 with a ball of the ball joint is held in the spherical member, and a ring 19 is fitted in the member with a pin. Washers 21 and 22 are loosely fitted on the rod at each side of the spring 23, and a nut 24 is screwed on the end of the rod keeping these members inside the spherical pivot.

Since the spherical pivot connected by the ball joint to the rotor shaft is situated eccentrically to the axis of the shaft, one revolution of the shaft gives itself an axial movement, therefore the drill, which is held in the chuck in contact directly or indirectly with the head of the rotor shaft, is struck the same number of times as the rotor rotates. When the rotor shaft is at each extreme end of its axial movements, the spring in the spherical pivot is compressed by either of the washers 21 and 22, so that the shock which would be given to the rotor shaft at the extreme ends of its movements is moderated.

Figure 3:
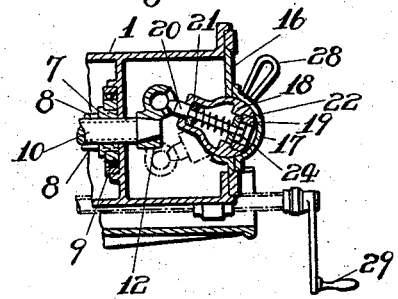
Fig. 3 is a sectional elevation of the rear part of the rock drill with the table in such a position that the centre of the spherical pivot is situated on the axial line of the rotor shaft.

When the table is turned half a revolution from the position shown in Fig. 1, the centre of the spherical pivot and the axis of the rotor shaft are coincident, so that the revolution of the shaft does not move in axial direction, but only rotates the head of the rod in the spherical pivot. In other words the length of a stroke of the shaft is the maximum when the spherical pivot is in the position shown in Fig. 1, while it is the minimum or zero when the same is in the position shown in Fig. 3. Placing the spherical pivot in any position between these two extreme points, any required length of stroke of the shaft can be obtained, so that the intensity of the blow of the drill can be easily adjusted.

In case the drill can not be turned due to an abnormal resistance or any such accident, the clutch on the driving spindle of the drill disengages automatically, so that there would be no mechanical or electrical damage to the drill.

I claim:

1. A rock drill comprising an electric motor in a frame, the shaft of the motor having a sliding fit in the rotor, a toothed-wheel provided on one end of the shaft for driving a drill, and a spherical pivot eccentrically mounted on a rotatable table on the frame and connected by a ball joint to the other end of the shaft.

2. A rock drill comprising an electric motor in a frame, the shaft of the motor having a sliding fit in the rotor, a toothed wheel provided on one end of the shaft for driving a drill, and a spherical pivot eccentrically mounted on a rotatable table on the frame and connected by a ball joint to the other end of the shaft, the spherical pivot being provided with a helical spring and a rod with a ball for the ball joint within the spherical member so as to moderate the shock which would be produced at the extreme ends of axial movements of the rod by the compression of the spring.

3. A rock drill comprising an electric motor in a frame, the shaft of the motor having a sliding fit in the rotor, a spherical pivot eccentrically mounted on a rotatable table on the frame and connected by a ball joint to the other end of the shaft, a toothed wheel provided on an end of the shaft to drive a drill through intermediate gears, and a jaw clutch, which is engaged by the pressure of a spring but automatically disengages the connection of the intermediate gears when an abnormal resistance is encountered by the drill.

4. A rock drill comprising an electric motor in a frame, the shaft of the motor having a sliding fit in the rotor, a toothed wheel provided on an end of the shaft to drive a drill through intermediate gears including a jaw clutch with trapezoidal recesses and projections and a spring, and a spherical pivot eccentrically mounted on a rotatable table on the frame and connected by a ball joint with the other end of the shaft, said spherical pivot being provided with a helical spring and a rod with a ball of the ball joint within the spherical member, for the purpose of striking the drill once per revolution of the shaft, of facilitating the control of the striking intensity of the drill, and for automatically disengaging the connection of the driving gears for the drill when an abnormal resistance is encountered by the drill.

In testimony whereof I hereunto affix my signature.

TAKASUKE NAKAYAMA.